3,028,355
PROCESS OF BLENDING POLYETHYLENE AND DIATOMACEOUS EARTH AND PRODUCT THEREOF

Gerald R. Toy, Park Forest, and Marvin E. Krasnow, Wilmette, Ill., assignors to Union Carbide Corporation, a corporation of New York
No Drawing. Filed Aug. 21, 1957, Ser. No. 679,535
8 Claims. (Cl. 260—41)

This invention relates to plastic compositions and more particularly to polyethylene compositions and to film produced therefrom.

Thin self-sustaining polyethylene film possesses many properties, such as inertness to chemicals, mechanical strength, low moisture vapor permeability, and transparency, which make it desirable as a wrapping and packaging material. However, there is a tendency for adjacent surfaces of the polyethylene films to adhere to one another when subjected to even slight pressure. This phenomenon of thin sheets of film sticking to one another when superimposed is called "blocking" and is found also, for example, in the adherence of the inner walls of melt-extruded tubing to each other which makes opening of the tube difficult.

An object of this invention is to provide novel compositions of polyethylene for producing films which exhibit a greatly reduced tendency to block.

Another object of this invention is to provide a polyethylene film with improved anti-blocking characteristics.

Other and additional objects will become apparent hereinafter.

The above objects are accomplished in general, by intimately incorporating a small amount of finely divided diatomaceous earth into a normally solid ethylene polymer, said incorporation being effected at a temperature at least sufficient to cause softening of the ethylene polymer. Quite surprisingly, we have found that within certain critical limits, as to quantity and particle size of the diatomaceous earth, such a composition, after forming into a self-sustaining film, will possess improved anti-blocking characteristics without materially affecting the clarity of the film.

In accordance with the present invention, we have discovered that if the diatomaceous earth having an average particle size between about 2 to about 6 microns is employed in amounts between about 0.2 part to 0.4 part by weight per 100 parts of polyethylene, the films made therefrom will have a reduced tendency to block and the clarity of the films produced from these compositions is not readily discernible by the naked eye from those films produced from similar polyethylene compositions but free of diatomaceous earth. For purposes of this invention, polyethylene films having a haze value not more than 12.5% as determined by ASTM method D-1003-49T are considered as film of good clarity. In the ASTM method, the haze of a specimen is that percentage of transmitted light which in passing through the specimen deviates from the incident beam by forward scattering.

Any film-forming polyethylene which is capable of being melt-extruded into self-sustaining film can be used in this invention. Polyethylene with a melt index below about 8.5 and a density of between approximately 0.91 and 0.97 is, however, preferred.

If desired, other materials, such as dyes, pigments, resins, stabilizers, lubricants, slip agents, palsticizers, and the like may be added to the composition. These, however, should not be added in an amount which adversely affects the improved anti-blocking characteristics obtained by the addition of the diatomaceous earth.

The particle size and amount of diatomaceous earth added to the polyethylene to secure the anti-blocking effect without materially affecting the clarity of the film are critical. If less than .2 part of diatomaceous earth per 100 parts of polymer is employed, little or no effect on blocking is secured. When greater than 0.4 part of diatomaceous earth per 100 parts of polymer is present, the film is characterized by a decreased clarity as compared to a similar film free of diatomaceous earth and would not be considered as good clarity film. When the particle size of the diatomaceous earth is less than about an average of 2 microns, the quantity necessary to achieve satisfactory anti-blocking characteristics will result in a product which would not be considered as good clarity film. The same is true when the particle size of the diatomaceous earth is greater than an average of about 6 microns.

Especially suitable are the following illustrative compositions:

| | | |
|---|---|---|
| Polyethylene, parts by weight | 100 | 100 |
| Diatomaceous earth particle size in microns | 4-6 | 2-4 |
| Parts by weight | .2-.3 | .3-.4 |

The diatomaceous earth is incorporated in the polyethylene by a method which insures a uniform mixture of the components of the composition and wherein the polyethylene is blended with the diatomaceous earth at a temperature sufficient to cause softening of the ethylene polymer. It is to be preferred that the polyethylene and the diatomaceous earth be blended at a temperature somewhat above the melting point of the ethylene polymer.

The components of the composition can be blended in a differential two-roll mill, for example, with the rolls at a temperature sufficient to soften, or preferably melt, the polyethylene. Alternatively, a Banbury mixer maintained at a temperature to soften or preferably melt the polyethylene, can be used.

The aforementioned methods can be used to prepare the homogeneous compositions to be melt-extruded. If desired, the aforementioned methods can be used to prepare a polyethylene-diatomaceous earth blend wherein the concentration of diatomaceous earth is higher than that required in the composition to be melt-extruded and this concentrate mixed with the appropriate quantity of polyethylene to provide melt-extrudable compositions of the proportions hereinbefore stated.

It is, of course, to be understood that the product resulting from the mill or mixer is pelletized to a size suitable for melt-extrusion.

The composition can be used for the production of any shaped article requiring anti-blocking characteristics. It is admirably suited for the production of self-sustaining film either in the form of flattened seamless tubing or web (single thickness of film) of both indefinite and definite lengths. The wall thickness of the seamless tubing and the thickness of the web can be between approximately 0.5 mil to 6 mils or higher.

In the preferred form of the invention, seamless flattened tubing is obtained by hot-melt extruding the composition by the tubular expansion process of U.S. Patent Nos. 2,461,975 and 2,632,206. When single thickness film is desired, the tubing produced by the previously mentioned method may be longitudinally slit or the composition may be calendered or melt-extruded through a slot.

Film produced by melt-extruding the compounded composition of this invention has improved anti-blocking characteristics as compared to film made from polyethylene alone. The other physical properties of the polyethylene film such as haze, tensile strength, tear strength, elongation, and heat sealability are substantially the same as the film made from polyethylene free of diatomaceous earth.

Treating the film to improve printability, by the known processes, and the printing of said film is not impaired by the presence of the anti-blocking agent.

The following examples are illustrative of the invention.

EXAMPLE I 97.5 parts of polyethylene having a density of 0.914 and a melt index of 1.8 was blended on a roll mill, at a temperature sufficient to melt the polyethylene, with 2.5 parts of diatomaceous earth having an average particle size of 4 to 6 microns until a homogeneous mixture was obtained. The composition was removed from the rolls and then cooled and pelletized to a size suitable for melt extrusion. One part of the pellets of the concentrate was then admixed with 9 parts of similar sized pellets of polyethylene, the latter being the same as the polyethylene employed in the production of the concentrate.

The polyethylene composition as prepared above and containing approximately 0.25 part of diatomaceous earth was extruded by the hot melt process of U.S. Patent No. 2,461,975 to produce thin flexible self-sustaining film in the form of flattened seamless tubing having a wall thickness of 2 mils. The properties of this film are set out in Table 1.

EXAMPLE II

Example I was repeated except that the 0.25 parts of diatomaceous earth having an average particle size of 2 to 4 microns per 100 parts of polyethylene, were used. The properties of this film are set out in Table 1.

EXAMPLE III (Control)

As a control, polyethylene, the same as used in Example I, but free of diatomaceous earth, was melt-extruded by the same method and under the same conditions to produce similar flattened tubing of the same wall thickness as above described. The properties of this film are set out in Table 1.

Table 1

| Example | Haze a Percent | Blocking b |
|---|---|---|
| I | 12.3 | 14.8 |
| II | 9.5 | 34.3 |
| III | 8.7 | 45.8 | a Determined by ASTM method D–1003–49T.
b Blocking herein is the force in grams required to separate 16 square inches of surface of the film adhering to itself by the following procedure: The apparatus consists of two plates, each being square and four inches on each side. The lower plate is fixed in position while the upper plate is suspended from an arm, the center of which is connected to a fulcrum point. On the other side of the arm, a pan and beaker are suspended. The apparatus is so adjusted by the addition of weights to either side that the suspended upper plate is just barely touching or is within three thousands of an inch of, the fixed lower plate.
Without including any of the folded edges, samples four inches by five inches are obtained by carefully cutting through both thicknesses of the flattened tubing. The two thicknesses of the sample are separated manually at each of the narrow edges for a distance inwardly of one-half inch. The sample is slipped between the fixed and suspended plates and centered thereon. The flaps of the lower thickness of film are taped to the fixed plate and the upper thickness of film taped to the suspended plate. Water is continuously added to the beaker, at the rate of 1.5 grams per minute, until the two thicknesses of film have just separated completely. The blocking value is taken as that weight, in grams, needed to completely separate the films. Film having blocking values of not more than of the order of 35 or less when determined by the aforementioned method are regarded as having satisfactory anti-blocking characteristics.

The composition of this invention fills a growing need for a film composition which offers the advantage of having improved anti-blocking characteristics and possesses, at the same time, a clarity indistinguishable by the unaided eye from film whose blocking tendencies have not been reduced.

Though the invention has been described specifically in connection with a specific film forming polyolefin, i.e., polyethylene, it is manifest that the principles thereof can be applied to other film forming polyolefins, copolymers of olefines and mixtures of polyolefines, such as, for example, polypropylene, polybutylene, copolymers of ethylene and propylene.

Since it is obvious that many changes and modifications can be made in the above-described details without departing from the nature and spirit of the invention, it is to be understood that the invention is not to be limited thereto except as set forth in the appended claims.

Herein and in the claims the proportions are by weight.

We claim:

1. A composition for producing, by hot melt extrusion, polyethylene film characterized by clarity and improved anti-blocking characteristics, said composition comprising polyethylenes and an anti-blocking agent consisting of diatomaceous earth in an amount from 0.2 to 0.4 part by weight per 100 parts by weight of the polyethylene and having an average particle size from 2 to 6 microns.

2. A composition as set forth in claim 1 wherein the parts by weight of the diatomaceous earth are 0.25.

3. Polyethylene film characterized by clarity and improved anti-blocking characteristics and comprising polyethylene and an anti-blocking agent consisting of diatomaceous earth in an amount from 0.2 to 0.4 part by weight per 100 parts by weight of the polyethylene and having an average particle size from 2 to 6 microns.

4. Polyethylene film as set forth in claim 3 wherein the parts by weight of the diatomaceous earth are 0.25.

5. In the production of polyethylene film characterized by clarity and improved anti-blocking characteristics the step which comprise melt-extruding a homogeneous mixture containing 100 parts by weight of a polyethylene having a melt index below 8.5 and a density between 0.91 and 0.97 blended with 0.2 to 0.4 part by weight of diatomaceous earth having an average particle size from 2 to 6 microns.

6. Polyethylene film according to claim 3, said film having a haze value of not more than 12.5 percent as determined by ASTM method D–1003–49T.

7. A composition for producing, by hot melt extrusion, polyethylene film having improved anti-blocking characteristics, said composition consisting essentially of polyethylene and an anti-blocking agent consisting of diatomaceous earth in an amount from 0.2 to 0.4 part by weight per 100 parts by weight of the polyethylene and having an average particle size from 2 to 6 microns.

8. In the production of polyethylene film having improved anti-blocking characteristics the step which comprises melt-extruding a homogeneous mixture containing 100 parts by weight of polyethylene blended with 0.2 to 0.4 part by weight of diatomaceous earth having an average particle size from 2 to 6 microns.

References Cited in the file of this patent

UNITED STATES PATENTS

| | | |
|---|---|---|
| 2,454,800 | Hartstein et al. | Nov. 30, 1948 |
| 2,467,341 | Seymour | Apr. 12, 1949 |
| 2,561,063 | McBurney et al. | July 17, 1951 |
| 2,770,609 | Symonds | Nov. 13, 1956 |

OTHER REFERENCES

Bostwick et al.: "Filled Polyethylene Compounds," Ind. and Eng. Chem., pages 848–849, May 1950.